United States Patent
Hasegawa (12) 
(10) Patent No.: US 9,127,179 B1
(45) Date of Patent: Sep. 8, 2015

(54) BLACK INK FOR INKJET RECORDING, INK CARTRIDGE, AND INKJET RECORDING DEVICE

(71) Applicant: Ken Hasegawa, Kanagawa (JP)

(72) Inventor: Ken Hasegawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/610,047

(22) Filed: Jan. 30, 2015

(30) Foreign Application Priority Data

Mar. 6, 2014 (JP) .................. 2014-043768

(51) Int. Cl.
| | |
|---|---|
| *B41J 2/175* | (2006.01) |
| *C09D 11/324* | (2014.01) |
| *C09D 11/36* | (2014.01) |
| *C09D 11/322* | (2014.01) |
| *C08K 3/04* | (2006.01) |
| *C08K 5/3417* | (2006.01) |
| *C08K 5/3437* | (2006.01) |

(52) U.S. Cl.
CPC ............... *C09D 11/324* (2013.01); *C08K 3/04* (2013.01); *C08K 5/3417* (2013.01); *C08K 5/3437* (2013.01); *C09D 11/322* (2013.01); *C09D 11/36* (2013.01)

(58) Field of Classification Search
CPC ....... B41J 2/175; G01D 11/00; C09D 11/322; C09D 11/324; C09D 11/36
USPC ..................................... 347/86, 100
See application file for complete search history.

(56) References Cited

U.S. PATENT DOCUMENTS

| | | | | |
|---|---|---|---|---|
| 2011/0057984 | A1* | 3/2011 | Kuwabara et al. | 347/20 |
| 2011/0249055 | A1* | 10/2011 | Sasada et al. | 347/20 |
| 2013/0050366 | A1* | 2/2013 | Sasada et al. | 347/100 |

FOREIGN PATENT DOCUMENTS

| | | |
|---|---|---|
| JP | 2000-351931 | 12/2000 |
| JP | 3859109 | 9/2006 |

\* cited by examiner

*Primary Examiner* — Alessandro Amari
*Assistant Examiner* — Michael Konczal
(74) *Attorney, Agent, or Firm* — Cooper & Dunham LLP (57) ABSTRACT

To provide a black ink for inkjet recording, including: carbon black and a complementary color pigment thereof each serving as a colorant; a water-soluble organic solvent; and water, wherein the carbon black, the complementary color pigment, or a combination thereof is a self-dispersion type pigment.

8 Claims, 3 Drawing Sheets

BLACK INK FOR INKJET RECORDING, INK CARTRIDGE, AND INKJET RECORDING DEVICE

BACKGROUND OF THE INVENTION

1. Field of the Invention

The present invention relates to a black ink for inkjet recording, an ink cartridge, and an inkjet recording device.

2. Description of the Related Art

For a black ink for inkjet recording, carbon black is generally used as a colorant. The carbon black has a black color with slight other colors, so that the carbon black is not completely black color (i.e., achromatic color). Therefore, it has been known a means for obtaining an image having higher blackness by adding complementary colors to the slight other colors to thereby reducing saturation to that of the achromatic color.

For example, Japanese Patent (JP-B) No. 3859109 describes a black ink composition containing the carbon black in combination with a cyan pigment and a magenta pigment. A colorant of the complementary color may be a dye or a pigment, but is preferably the pigment from the viewpoint of lightfastness of the resultant image. However, use of a mixture of a plurality of the pigments makes it difficult to keep the pigments in their optimal dispersion states. Therefore, there is a problem that the pigments aggregate with each other over time, so that desired blackness cannot be achieved.

SUMMARY OF THE INVENTION

The present invention aims to solve the problem and provide a black ink for inkjet recording having high storage stability and high blackness.

The above problem can be solved by the present invention.

A black ink for inkjet recording, including:

carbon black and a complementary color pigment thereof each serving as a colorant;

a water-soluble organic solvent; and water, wherein the carbon black, the complementary color pigment, or a combination thereof is a self-dispersion type pigment.

DETAILED DESCRIPTION OF THE INVENTION

<Black Ink for Inkjet Recording>

A black ink for inkjet recording (hereinafter may be referred to as ink) of the present invention contains carbon black, a complementary color pigment thereof, a water-soluble organic solvent, and water; and, preferably contains a surfactant and a foam suppressor.

[Carbon Black]

Examples of the carbon black include furnace black, gas black, lamp black, acetylene black, and channel black. A DBP absorption amount of the carbon black is preferably 25 mL/100 g to 400 mL/100 g, more preferably 30 mL/100 g to 200 mL/100 g, further preferably 50 mL/100 g to 150 mL/100 g.

An amount of the carbon black relative to a total amount of the ink is preferably 1% by mass to 15% by mass, more preferably 2% by mass to 10% by mass. The carbon black in the amount falling within the more preferable range can achieve the ink being more excellent in storage stability.

[Complementary Color Pigment]

Examples of the complementary color pigment include anthraquinone, phthalocyanine blue, phthalocyanine green, diazo, monoazo, pyranthrone, perylene, heterocyclic yellow, quinacridone, and (thio)indigoid.

Representative examples of the anthraquinone include Pigment Red 43, Pigment Red 194 (perinone red), Pigment Red 216 (brominated to pyranthrone red), and Pigment Red 226 (pyranthrone red).

Representative examples of the phthalocyanine blue include copper phthalocyanine blue and derivatives thereof (Pigment Blue 15:3).

Representative examples of the perylene include Pigment Red 123 (vermillion), Pigment Red 149 (scarlet), Pigment Red 179 (maroon), Pigment Red 190 (red), Pigment Violet, Pigment Red 189 (yellow shade red), and Pigment Red 224.

Representative examples of the heterocyclic yellow include Pigment Yellow 117 and Pigment Yellow 138.

Representative examples of the quinacridone include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42.

Representative examples of the thioindigoid include Pigment Red 86, Pigment Red 87, Pigment Red 88, Pigment Red 181, Pigment Red 198, Pigment Violet 36, and Pigment Violet 38.

Examples of other available color pigments are described in The Colour Index, the third edition (The Society of Dyers and Colourists, 1982).

Among them, preferable are C. I. Pigment Blue 15:3 and C. I. Pigment Red 122. These pigments can achieve an image having higher blackness when mixing with the carbon black.

The complementary color pigment is added preferably in an amount of 0.3% by mass or less, more preferably in an amount of 0.01% by mass to 0.2% by mass relative to an amount of the carbon black. The complementary color pigment in the amount falling within the above range can achieve an image having much higher blackness.

(Self-Dispersion Type Pigment)

In the present invention, a so-called self-dispersion type pigment is used in which at least one type of hydrophilic group is bound to a surface of the carbon black, the complementary color pigment, or both thereof directly or through other atomic groups so that the pigment is stably dispersed without a dispersing agent. The self-dispersion type pigment is preferably ionic, and is suitably anionically or cationically charged.

Examples of an anionic hydrophilic group include —COOM, —SO$_3$M, —PO$_3$HM, —PO$_3$M$_2$, —SO$_2$NH$_2$, —SO$_2$NHCOR wherein M denotes a hydrogen atom, alkali metal, ammonium or organic ammonium, and R denotes an alkyl group having 1 to 12 carbon atoms, an optionally substituted phenyl group, or an optionally substituted naphthyl group. Among them, preferable are —COOM, and —SO$_3$M.

Examples of a method for obtaining the anionically charged pigment include, but not limited thereto, a method in which a pigment is subjected to an oxidation treatment with sodium hypochlorite, a method in which a pigment is subjected to a sulfonation treatment, and a method in which a pigment is allowed to react with a diazonium salt.

Example of a hydrophilic group which binds to a surface of the cationically charged color pigment includes a quaternary ammonium group. Among them, at least one of the quaternary ammonium groups represented by the following formulae is preferably bound to the surface of the pigment.

In the present invention, a dispersing agent-dispersion type pigment or a resin-coated type pigment may be used in combination with the self-dispersion type pigment in the carbon black or the complementary color pigment.

(Dispersing Agent-Dispersion Type Pigment)

A dispersing agent for dispersing a pigment may be known dispersing agents used in preparing a pigment dispersion. Examples thereof include the following:

polyacrylic acid, polymethacrylic acid, acrylic acid-acrylonitrile copolymer, vinyl acetate-acrylic ester copolymer, acrylic acid-acrylic alkyl ester copolymer, styrene-acrylic acid copolymer, styrene-methacrylic acid copolymer, styrene-acrylic acid-acrylic alkyl ester copolymer, styrene-methacrylic acid-acrylic alkyl ester copolymer, styrene-α-methylstyrene-acrylic acid copolymer, styrene-α-methylstyrene-acrylic acid copolymer-acrylic alkyl ester copolymer, styrene-maleic acid copolymer, vinylnaphthalene-maleic acid copolymer, vinyl acetate-ethylene copolymer, vinyl acetate-fatty acid vinyl ethylene copolymer, vinyl acetate-maleic ester copolymer, vinyl acetate-crotonic acid copolymer, and vinyl acetate-acrylic acid copolymer.

A nonionic or anionic surfactant-based dispersing agent used for dispersing a pigment may be appropriately selected depending on a type of the pigment or ink formulation.

Examples of the nonionic surfactant include polyoxyethylene alkyl ethers such as polyoxyethylene lauryl ether, polyoxyethylene myristyl ether, polyoxyethylene cetyl ether, polyoxyethylene stearyl ether, and polyoxyethylene oleyl ether; polyoxyethylene alkyl phenyl ethers such as polyoxyethylene octyl phenyl ether, and polyoxyethylene nonyl phenyl ether; polyoxyethylene-α-naphthyl ether, polyoxyethylene-β-naphthyl ether, polyoxyethylene monostyryl phenyl ether, polyoxyethylene distyryl phenyl ether, polyoxyethylene alkyl naphthyl ether, polyoxyethylene monostyryl naphthyl ether, polyoxyethylene distyryl naphthyl ether, and polyoxyethylene polyoxypropylene block copolymer.

A surfactant in which some of polyoxyethylene in the surfactant is substituted with polyoxypropylene or a surfactant in which a compound having an aromatic ring (e.g., polyoxyethylene alkyl phenyl ether) is condensated with formalin may be used.

The nonionic surfactant having HLB of 12 to 19.5, preferably 13 to 19 can result in a stable dispersion state because it is compatible with a dispersion medium.

Examples of the anionic surfactant include polyoxyethylene alkyl ether sulfate, polyoxyethylene alkyl phenyl ether sulfate, polyoxyethylene monostyryl phenyl ether sulfate, polyoxyethylene distyryl phenyl ether sulfate, polyoxyethylene alkyl ether phosphate, polyoxyethylene alkyl phenyl ether phosphate, polyoxyethylene monostyryl phenyl ether phosphate, polyoxyethylene distyryl phenyl ether phosphate, polyoxyethylene alkyl ether carboxylate, polyoxyethylene alkyl phenyl ether carboxylate, polyoxyethylene monostyryl phenyl ether carboxylate, polyoxyethylene distyryl phenyl ether carboxylate, naphthalene sulfonate-formalin condensate, melanin sulfonate-formalin condensate, dialkyl sulfosuccinic ester salt, sulfosuccinic acid alkyl disalt, polyoxyethylene alkyl sulfosuccinic acid disalt, alkyl sulfoacetate, α-olefin sulfonate, alkylbenzene sulfonate, alkyl naphthalene sulfonate, alkyl sulfonate, N-acylamino acid salt, acylated peptide, and soap. Among them, particularly preferable are sulfate or phosphate of polyoxyethylene alkyl ether, polyoxyethylene alkyl phenyl ether, and polyoxyethylene distyryl phenyl ether.

The surfactant-based dispersing agent is added to a pigment in an amount of 10% by mass to 50% by mass, which improves storage stability and ejection stability of the resultant pigment dispersion and the ink.

(Resin-Coated Type Pigment)

The resin-coated type pigment consists of polymer emulsion in which water-insoluble or poorly water-soluble color material is contained in polymer particles. The phrase "color material is contained" means a state in which the color material is encapsulated into the polymer particles and/or a state in which the color material is adsorbed onto surfaces of the polymer particles. Note that, all of the color material incorporated in the ink of the present invention is not necessary to be encapsulated into or adsorbed onto the polymer particles. Some of the color material may be dispersed in the emulsion as long as an effect of the present invention is not impaired.

The color material is not particularly limited as long as it is water-insoluble or poorly water-soluble, and can be adsorbed onto the polymer particles. The phrase "water-insoluble or poorly water-soluble" means that only less than 10 parts by mass of the color material can be dissolved into 100 parts by mass of water at 20° C. The term "dissolved" means that the color material is not visually observed to be separated on or precipitated in a surface layer or a bottom layer of an aqueous solution. Examples of the color material include dyes such as an oil-soluble dye or a disperse dye and pigments. The oil-soluble dye and the disperse dye are preferable from the viewpoints of good adsorptivity and encapsulatability. Meanwhile, the pigments are preferable from the viewpoint of lightfastness of the resultant image.

A colorant used in the present invention is preferably dissolved in an organic solvent (e.g., a ketone-based solvent) in an amount of 2 g/L or more, further preferably 20 g/L to 600 g/L from the viewpoint of efficient impregnation into the polymer particles. Examples of a polymer used for forming the polymer emulsion include a vinyl-based polymer, a polyester-based polymer, and a polyurethane-based polymer. The vinyl-based polymer and the polyester-based polymer are particularly preferable. Specifically, polymers disclosed in Japanese Patent Application Laid-Open (JP-A) No. 2000-53897 and JP-A No. 2001-139849 are suitable.

The colorant is incorporated preferably in amount of 10 parts by mass to 200 parts by mass, more preferably 25 parts by mass to 150 parts by mass relative to 100 parts by mass of the polymer. The polymer particles containing the colorant have preferably an average particle size of 0.16 μm or less in the ink.

The polymer particles is contained preferably in an amount of 8% by mass to 20% by mass, more preferably 8% by mass to 12% by mass in terms of a solid content in the ink.

[Water-Soluble Organic Solvent]

The ink of the present invention contains water as a solvent, and further contains a water-soluble organic solvent for the purpose of preventing the ink from drying and improving dispersion stability. A mixture of a plurality of the water-soluble organic solvents may be used.

Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate.

Examples of the polyhydric alcohols include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylolethane, trimethylolpropane, glycerol, 1,2,3-butanetriol, 1,2,4-butanetriol, 1,2,6-hexanetriol, and petriol.

Examples of the polyhydric alcohol alkyl ethers include ethylene glycol monoethyl ether, ethylene glycol monobutyl ether, diethylene glycol monomethylether, diethylene glycol monoethyl ether, diethylene glycol monobutyl ether, tetraethylene glycol monomethylether, and propylene glycol monoethyl ether.

Examples of the polyhydric alcohol aryl ethers include ethylene glycol monophenyl ether, and ethylene glycol monobenzyl ether.

Examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam, and γ-butyrolactone.

Examples of the amides include acetamide, dimethylformamide, and diethyl acetamide.

Examples of the amines include monoethanolamine, diethanolamine, triethanolamine, monoethylamine, diethylamine, and triethylamine.

Examples of the sulfur-containing compounds include dimethylsulfoxide, sulfolane, and thiodiethanol.

Among these water-soluble organic solvent, preferable are glycerin, ethylene glycol, diethylene glycol, triethylene glycol, propylene glycol, dipropylene glycol, tripropylene glycol, 1,3-butanediol, 2-methyl-1,3-butanediol, 3-methyl-1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, N-hydroxyethyl-2-pyrrolidone, and 1,3-dimethyl-2-imidazolidinone. These solvents exhibit excellent effects on solubility and prevention of jetting failure resulting from moisture evaporation. Additionally, these solvents can achieve the ink being excellent in storage stability and ejection stability.

An incorporation ratio of colorant particles and the water-soluble organic solvent greatly affects ejection stability of the ink. In the case where a solid content of the pigment is high although only a small amount of the water-soluble organic solvent is incorporated, moisture evaporation in the vicinity of a nozzle is encouraged, leading to ejection failure.

The ink of the present invention may contain, in addition to the water-soluble organic solvent, other water-soluble organic solvents such as saccharides and derivatives thereof, if necessary. The saccharides are used mainly for the purpose of improving drying resistance. Examples of the saccharides include monosaccharides, disaccharides, oligosaccharides (including trisaccharides and tetrasaccharides), polysaccharides, and derivatives thereof. Specific examples of the saccharides include glucose, mannose, fructose, ribose, xylose, trehalose, and maltotriose. The term polysaccharides, as used herein, means saccharides in a broad sense including widely naturally occurring substances such as α-cyclodextrin and cellulose. Examples of the derivatives of the saccharides include reducing sugars and oxidizing sugars of the saccharides. Among them, preferable are sugar alcohols. Specific examples thereof include maltitol and sorbitol.

An amount of the saccharides contained in the ink is preferably 0.1% by mass to 40% by mass, more preferably 0.5% by mass to 30% by mass.

[Surfactant]

The surfactant contained in the ink is not particularly limited and may be appropriately selected from surfactants which do not impair dispersion stability depending on a type of the colorant and a combination with the water-soluble organic solvent and a permeating agent. In particular, in the case of printing onto a recording medium, a fluorosurfactant and a silicone-based surfactant which have low surface tension and a high leveling property are suitable. Among them, the fluorosurfactant is preferable.

Particularly preferable fluorosurfactant are a perfluoroalkyl sulfonate compound, a perfluoroalkyl carboxylate compound, a perfluoroalkyl phosphate ester compound, a perfluoroalkyl ethylene oxide adduct, and a polyoxyalkylene ether polymer compound having a perfluoroalkyl ether group in a side chain thereof from the viewpoint of low foamability.

Examples of the perfluoroalkyl sulfonate compound include perfluoroalkyl sulfonic acid and perfluoroalkyl sulfonate.

Examples of the perfluoroalkyl carboxylate compound include perfluoroalkyl carboxylic acid, and perfluoroalkyl carboxylate.

Examples of the perfluoroalkyl phosphate ester compound include perfluoroalkyl phosphate ester, and a salt of perfluoroalkyl phosphate ester.

Examples of the polyoxyalkylene ether polymer compound having a perfluoroalkyl ether group in a side chain thereof include a sulfate ester salt of a polyoxyalkylene ether polymer having a perfluoroalkyl ether group in a side chain thereof and a salt of a polyoxyalkylene ether polymer having a perfluoroalkyl ether group in a side chain thereof.

Examples of a counter ion of a salt in the fluorosurfactant Li, Na, K, $NH_4$, $NH_3CH_2CH_2OH$, $NH_2(CH_2CH_2OH)_2$, and $NH(CH_2CH_2OH)_3$.

The fluorosurfactant may be appropriately synthesized or may be a commercially available product. Examples of the commercially available product include SURFON series manufactured by ASAHI GLASS CO., LTD. (S-111, S-112, S-113, S-121, S-131, S-132, S-141, and S-145); FLUORAD series manufactured by Sumitomo 3M Limited (FC-93, FC-95, FC-98, FC-129, FC-135, FC-170C, FC-430, and FC-431); MEGAFAC series manufactured by DIC Corporation (F-470, F-1405, and F-474); ZONYL TBS, FSP, FSA, FSN-100, FSN, FSO-100, FSO, FS-300, and UR manufac- tured by E.I. du Pont de Nemours and Company; FT-110, FT-250, FT-252, FT-400S, FT-150, and FT-400SW manufactured by NEOS COMPANY LIMITED; and PF-151N manufactured by OMNOVA Solutions Inc. Among them, preferable is the fluorosurfactant represented by the following general formula:

$C_nF_{2n+1}$—$CH_2CH(OH)CH_2O$—$(CH_2CH_2O)_b$—Y

In the formula, n denotes an integer of 2 to 6, a denotes an integer of 15 to 50, and Y denotes —$C_bH_{2b+1}$ wherein b denotes an integer of 11 to 19, or $CH_2CH(OH)CH_2$—$C_mF_{2m+1}$ wherein m denotes an integer of 2 to 6.

Specific examples of the compound include those represented by the following formulae:

$C_4F_9$—$CH_2CH(OH)CH_2O$—$(CH_2CH_2O)_{35}CH_2CH(OH)CH_2$—$C_4F_9$

$C_4F_9$—$CH_2CH(OH)CH_2O$—$(CH_2CH_2O)_{45}$—$CH_2CH(OH)CH_2$—$C_4F_9$ $C_3F_7$—$CH_2CH(OH)CH_2O$—$(CH_2CH_2O)_{23}$—$CH_2CH(OH)CH_2$—$C_3F_7$ $C_6F_{13}$—$CH_2CH(OH)CH_2O$—$(CH_2CH_2O)_{23}$—$CH_2CH(OH)CH_2$—$C_6F_{13}$ $C_4F_9$—$CH_2CH(OH)CH_2O$—$(CH_2CH_2O)_{25}$—$C_{16}H_{33}$

Among those represented by the above formulae, preferable is the surfactant represented by the following formula:

$C_4F_9$—$CH_2CH(OH)CH_2O$—$(CH_2CH_2O)_{23}$—$CH_2CH(OH)CH_2$—$C_4F_9$

Note that, the fluorosurfactant having the structure represented is by the following formula does not contains PFOS (perfluorooctane sulfonic acid) or PFOA (perfluorooctanoic acid), so that it is excellent from the viewpoint of global environmental pollution.

The silicone-based surfactant is not particularly limited and may be appropriately selected depending on the intended purpose. In particular, preferable are those which are not decomposed even at a high pH. Examples thereof include side chain-modified polydimethylsiloxane, both terminal-modified polydimethylsiloxane, one terminal-modified polydimethylsiloxane, and side chain- and both terminal-modified polydimethylsiloxane. Particularly preferable are those having a polyoxyethylene group or a polyoxyethylene polyoxypropylene group as a modified group from the viewpoint of exhibiting a good property as an aqueous surfactant.

The silicone-based surfactant may be appropriately synthesized or may be a commercially available product. The commercially available product can be easily obtained from, for example, BYK-Chemie GmbH, Shin-Etsu Chemical Co., Ltd. and Dow Corning Toray Co., Ltd.

A polyether-modified silicone-based surfactant may be used as the silicone-based surfactant. Example of thereof include a compound in which a polyalkylene oxide structure is introduced into a Si-containing side chain in dimethylsiloxane.

A polyether-modified silicone compound may be appropriately synthesized or may be a commercially available product. The commercially available product includes KF-618, KF-642, and KF-643 (manufactured by Shin-Etsu Chemical Co.).

Other than the fluorosurfactant and the silicone-based surfactant, an anionic surfactant, a nonionic surfactant, and an amphoteric surfactant may be used.

Examples of the anionic surfactant include polyoxyethylene alkylether acetate, dodecylbenzene sulfonate, succinic ester sulfonate, laurate, and a salt of polyoxyethylene alkyl ether sulfate.

Examples of the nonionic surfactant include an acetylene glycol-based surfactant, polyoxyethylene alkyl ether, polyoxyethylene alkyl phenyl ether, polyoxyethylene alkyl ester, polyoxyethylene sorbitan fatty acid ester.

Examples of the acetylene glycol-based surfactant include 2,4,7,9-tetramethyl-5-decyne-4,7-diol, 3,6-dimethyl-4-octyn-3,6-diol, and 3,5-dimethyl-1-hexyne-3-ol. Examples of commercially available products thereof include SURFYNOL series manufactured by Air Products and Chemicals, Inc. (104, 82, 465, 485 and TG).

Examples of the amphoteric surfactant include lauryl amino propionate, lauryl dimethyl betaine, stearyl dimethyl betaine, lauryl dihydroxy ethyl betaine, lauryl dimethyl amine oxide, myristyl dimethyl amine oxide, stearyl dimethyl amine oxide, dihydroethyl lauryl amine oxide, polyoxyethylene coconut oil alkyldimethyl amine oxide, dimethylalkyl (coco)betaine, and dimethyl lauryl betaine. The commercially available products thereof can be easily obtained from, for example, Nikko Chemicals Co., Ltd., Nihon-Emulsion Co., Ltd., Nippon Shokubai Co., Ltd., TOHO Chemical Industry Co., Ltd., Kao Corporation, Adeka Corporation, Lion Corporation, Aoki Oil Industrial Co., Ltd., and Sanyo Chemical Industries.

The above-described various surfactants may be used alone or in combination. Even when the surfactant is not easily dissolved in the ink by itself, a mixture of a plurality of the surfactant may be solubilized and thus be stably present in the ink.

An amount of the surfactant contained in the ink is preferably 0.01% by mass to 4% by mass, more preferably 0.1% by mass to 1% by mass. The surfactant in the amount falling within the above range can result in good permeability into a recording medium and achieve an image having a high image density.

[Foam Suppressor]

The fluorosurfactant has a very excellent ability as a surfactant. Therefore, generated bubbles do not disappear and remain even when a commonly used silicone-based foam suppressor is added, potentially leading to ejection failure of the ink. Accordingly, in the present invention, N-octyl-2-pyrrolidone, 2,4,7,9-tetramethyldecane-4,7-diol, or 2,5,8,11-tetramethyldodecane-5,8-diol is added for the purpose of suppressing the bubbles from being generated.

Use of these foam suppressors in combination with the fluorosurfactant can prevent the bubbles from being generated and avoiding problems caused by the bubbles.

Surface tension of the ink containing the fluorosurfactant is determined by a ratio between the fluorosurfactant and the foam suppressor. In the case where surface tension of the ink needs to be decreased in accordance with a type of the recording medium, a proportion of the fluorosurfactant should be increased. However, as will be understood, a high proportion of the fluorosurfactant causes a problem related to foaming. Therefore, the proportion of the fluorosurfactant is preferably 40% by mass or less, more preferably 30% by mass or less relative to a total amount of the fluorosurfactant and the foam suppressor.

[Other Components]

In addition to the above-described components, the ink of the present invention may further contain, if necessary, a known permeating agent, known polymer particles, a known pH adjusting agent, or a known antiseptic/antifungal agent.

Preferable examples of the permeating agent include a polyol compound having 8 to 11 carbon atoms or a glycol ether compound. These have effects of accelerating a permeating speed of the ink into the recording medium while preventing bleeding. These are partially water-soluble compounds having a higher boiling point than water, being liquid at 25° C., and having a solubility of 0.1% by mass to 4.5% by mass in water at 25° C.

Examples of the polyol compound having 8 to 11 carbon atoms include 2-ethyl-1,3-hexanediol, 2,2,4-trimethyl-1,3-pentanediol, and 1,2-octanediol.

Examples of the glycol ether compound include a polyhydric alcohol alkyl ether compound, and a polyhydric alcohol aryl ether compound.

Examples of the polyhydric alcohol alkyl ether compound include ethylene glycol monoethyl ether, ethylene glycol monobutyl ether, diethylene glycol monomethylether, diethylene glycol monoethyl ether, diethylene glycol monobutyl ether, tetraethylene glycol monomethylether, and propylene glycol monoethyl ether.

Examples of the polyhydric alcohol aryl ether compound include ethylene glycol monophenyl ether, and ethylene glycol monobenzyl ether.

An amount of the permeating agent contained in the ink is preferably 0.1% by mass to 10% by mass, more preferably 0.5% by mass to 5% by mass.

As the polymer particles, those having a film forming property are used. The phrase "film forming property," as used herein, means that the polymer particles form a resin film when they are dispersed in water to thereby be formed into emulsion and then water is evaporated therefrom.

Such polymer particles play a role to allow the colorant contained in the ink to firmly adhere to the recording medium by forming a film when volatile components contained in the ink are evaporated. As a result, an image being excellent in abrasion resistance and water resistance can be achieved.

In order to allow the polymer particles to form a film at room temperature, the polymer particles preferably have the minimum film forming temperature of 30° C. or lower, more preferably 10° C. or lower. The phrase "the minimum film forming temperature," as used herein, means the minimum temperature at which a transparent continuous film is formed when polymer emulsion in which the polymer particles are dispersed in water is thinly spread onto a metal plate (e.g., an aluminum plate), followed by gradually heating. Examples of the polymer particles include RANDY PL series manufactured by MIYOSHI OIL & FAT CO., is LTD.

The polymer particles preferably have a volume average particle size of 5 nm to 200 nm, more preferably 10 nm to 100 nm.

The polymer particles may have a single particle structure. For example, when an alkoxysilyl group is contained in an emulsion particle, the alkoxysilyl group is brought into contact with residual moisture resulting from fusion of emulsion particles with each other caused by moisture evaporation in the course of coating film formation, to thereby be hydrolyzed to form a silanol group.

When the silanol group remains, it reacts with the alkoxysilyl group or each other, so that a firm crosslinked structure can be formed with siloxane bonds. Thus, in the presence of reactive functional groups in the polymer particles, it is possible to form a network structure without adding a curing agent by allowing these functional groups to react during film formation.

The polymer particles each having a core-shell structure consisting of a core portion and a shell portion which surrounds the core can be used. The phrase "core-shell structure," as used herein, means a structure in which two or more types of polymers having different compositions are present in different phases in each particle. Therefore, the core-shell structure includes not only those in which the shell portion completely covers the core portion, but also those in which the shell portion partially covers the core portion. A part of the polymer in the shell portion may form domains within the core particle. Furthermore, the core-shell structure may have a multilayer structure of three or more layers which further include, between the core portion and the shell portion, one or more layers having different compositions from the core portion and the shell portion.

The polymer particles can be obtained by known methods such as a method in which unsaturated vinyl monomers (unsaturated vinyl polymers) are emulsion-polymerized in water in the presence of a polymerization catalyst and an emulsifier. An amount of the polymer particles contained in the ink is preferably 0.5% by mass to 20% by mass, more preferably 1% by mass to 5% by mass. The polymer particles in the amount falling within the above-described range can achieve an image having an excellent effect of improving abrasion resistance and water resistance without causing problems such as ejection failure.

The ink preferably has a pH of 9 to 11. When the pH is higher than 11, the ink dissolves a large amount of materials of an ink-supplying unit, leading to problems such as deterioration, leakage, and ejection failure of the ink. Therefore, a pH adjusting agent is added in order to adjust the pH to the above-described range.

The pH adjusting agent is preferably added to a kneaded dispersion together with additives such as a wetting agent and the permeating agent, but not added when the pigment is knead-dispersed in water together with the dispersing agent. This is because the addition of some pH adjusting agents may adversely affect the dispersed state.

Examples of the pH adjusting agent include alcohol amines, alkali metal hydroxides, ammonium hydroxides, phosphonium hydroxides and alkali metal carbonates.

Examples of the alcohol amines include diethanolamine, triethanolamine, 2-amino-2-ethyl-1,3-propanediol. Examples of the alkali metal hydroxides include lithium hydroxide, sodium hydroxide and potassium hydroxide. Examples of the ammonium hydroxides include ammonium hydroxide and quaternary ammonium hydroxide. Example of the phosphonium hydroxides includes quaternary phosphonium hydroxide. Examples of the alkali metal carbonates include lithium carbonate, sodium carbonate and potassium carbonate.

Examples of the antiseptic/antifungal agent include sodium dehydroacetate, sodium sorbate, sodium 2-pyridinethiol-1-oxide, sodium benzoate and sodium pentachlorophenol.

Examples of an antirust agent include acidic sulfite, sodium thiosulfate, ammonium thiodiglycolate, diisopropyl ammonium nitrite, pentaerythritol tetranitrate, and dicyclohexyl ammonium nitrite.

<Inkjet Recording Device>

The ink of the present invention can be suitably applied to a variety of recording devices based upon inkjet recording systems, for example, inkjet recording printers, facsimile apparatuses, copiers, and printer/fax/copier multifunction peripherals.

An inkjet recording device used in Examples will now be outlined below.

Figure 1:
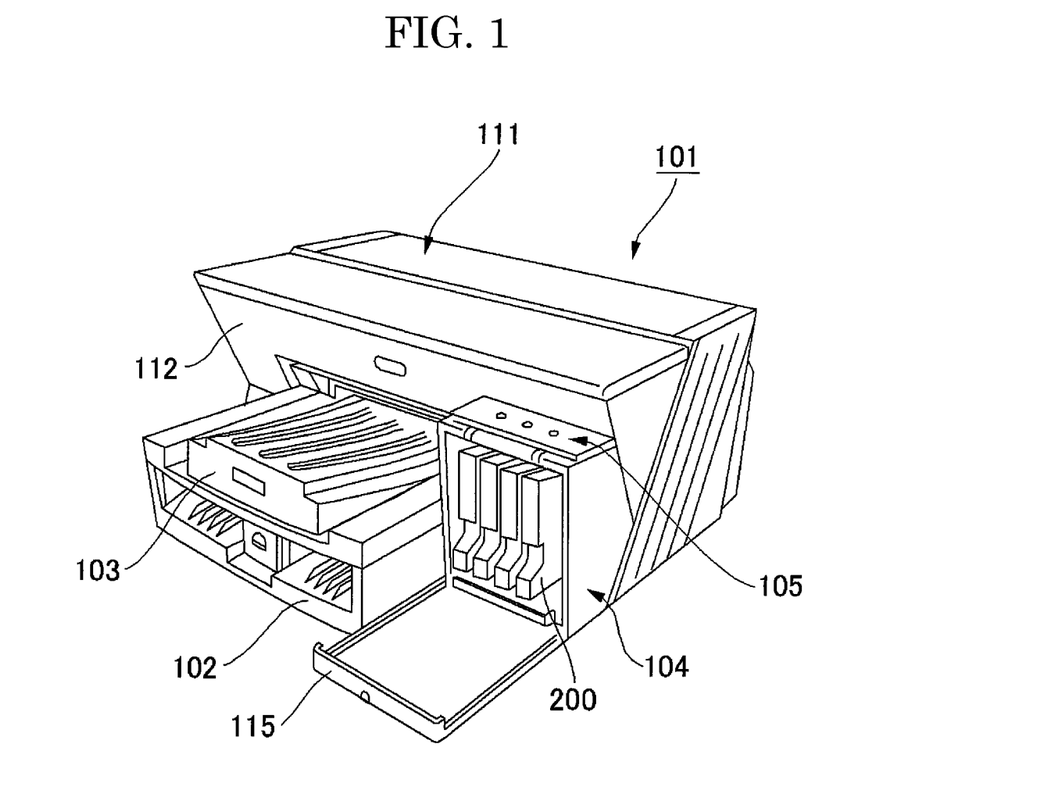
FIG. 1 is one exemplary diagram illustrating an inkjet recording device.

The inkjet recording device illustrated in FIG. 1 includes a main body (101), a paper feeding tray (102) for feeding paper into the main body (101), a paper ejection tray (103) for storing paper which has been fed into the main body (101) and on which an image has been recorded (formed), and an ink cartridge loading section (104). An operation unit (105) composed of, for example, operation keys and a display is placed on the upper surface of the ink cartridge loading section (104). The ink cartridge loading section (104) has a front cover (115) capable of opening and closing to attach and detach the ink cartridge (200). Reference numeral (111) denotes an upper cover and reference numeral (112) denotes a front surface of the front cover.

Figure 2:
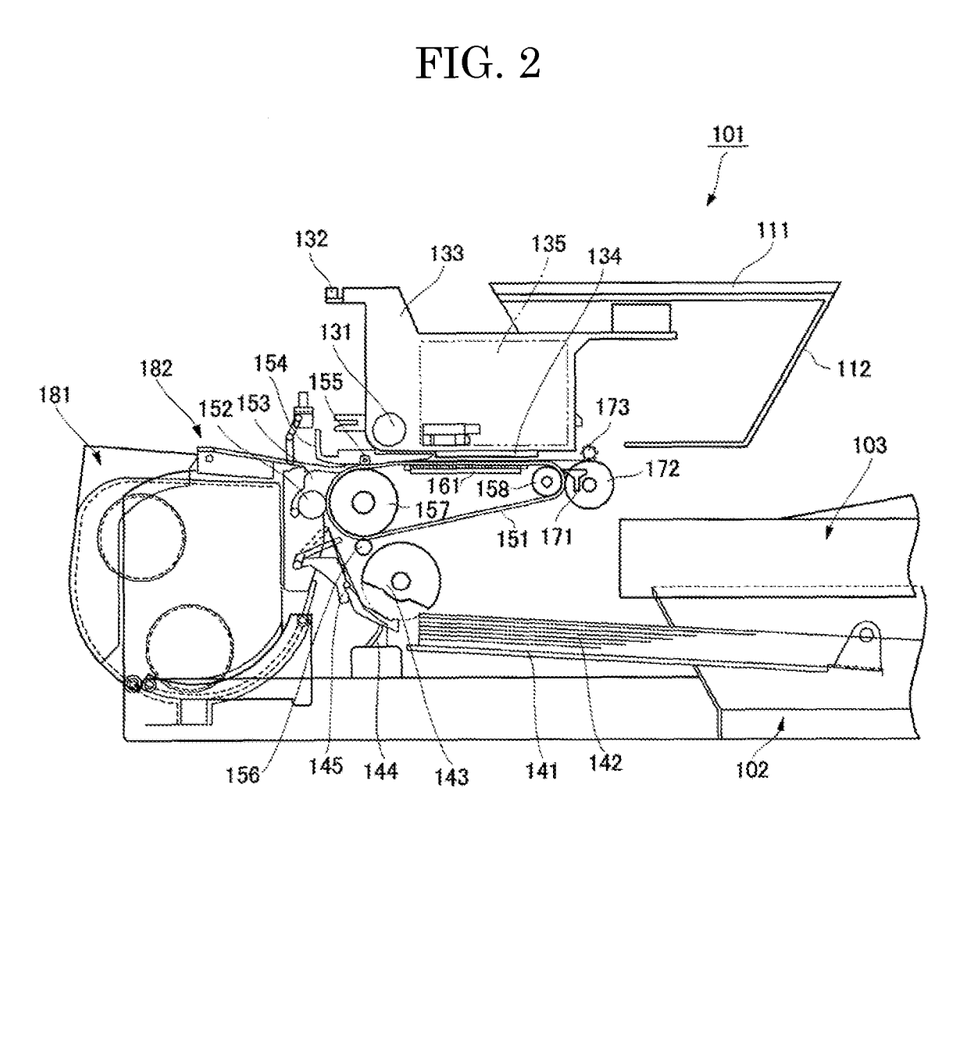
FIG. 2 is a diagram illustrating an interior of a main body of the recording device of FIG. 1.

In the main body (101), as illustrated in FIG. 2, a carriage (133) is slidably held in the main-scanning direction by a guide rod (131), which is a guide member laterally bridging left and right side plates (not illustrated), and a stay (132); and the carriage is moved for scanning by a main-scanning motor (not illustrated).

A recording head (134) composed of four heads for inkjet recording which eject ink droplets of yellow (Y), cyan (C), magenta (M) and black (Bk) is installed in the carriage (133) such that a plurality of ink ejection outlets are aligned in the direction intersecting the main-scanning direction and that an ink droplet ejection direction faces downward.

Each of the heads for inkjet recording constituting the recording head (134) may provided with, for example, any of the following actuators as a energy-generating unit for ejecting ink: a piezoelectric actuator such as a piezoelectric element, a thermal actuator that utilizes phase change caused by film boiling of liquid by using a thermoelectric conversion element such as a heat element, a shape-memory-alloy actuator that utilizes metal phase change caused by a change in temperature, and an electrostatic actuator that utilizes electrostatic force.

Also, the carriage (133) is provided with sub-tanks (135) of each color for supplying the inks of each color to the recording head (134). Each sub-tank (135) is supplied and replenished with the ink from the ink cartridge (200) of the present invention loaded into the ink cartridge loading section (104), via an ink supply tube (not illustrated).

Meanwhile, as a paper feeding section for feeding sheets of paper (142) loaded on a paper loading section (pressure plate) (141) of the paper feeding tray (102), there are provided a half-moon roller [paper feeding roller (143)] which feeds the sheets of paper (142) one by one from the paper loading section (141), and a separation pad (144) which faces the paper feeding roller (143) and is formed of a material with a large friction coefficient. This separation pad (144) is biased toward the paper feeding roller (143) side.

As a conveyance section for conveying the sheets of paper (142), which has been fed from this paper feeding section, under the recording head (134), there are provided a conveyance belt (151) for conveying the sheets of paper (142) by means of electrostatic adsorption; a counter roller (152) for conveying the sheets of paper (142), which is sent from the paper feeding section via a guide (145), such that the sheets of paper is sandwiched between the counter roller and the conveyance belt (151); a conveyance guide (153) for making the sheets of paper (142), which is sent upward in the substantially vertical direction, change its direction by approximately 90° and thusly correspond with the conveyance belt (151); and a front end pressurizing roller (155) biased toward the conveyance belt (151) side by a pressing member (154). There is also provided a charging roller (156) serving as a charging unit for charging a surface of the conveyance belt (151).

The conveyance belt (151) is an endless belt and is capable of moving in circles in the belt conveyance direction, with being wound around a conveyance roller (157) and a tension roller (158) in a stretched manner. The conveyance belt (151) has, for example, a surface layer serving as a paper adsorbing surface, that is formed of a resinous material [e.g., ethylene-tetrafluoroethylene copolymer (ETFE)] having a thickness of approximately 40 μm for which resistance control has not been conducted, and a back layer (intermediate resistance layer, ground layer) that is formed of the same material as this surface layer, for which resistance control has been conducted using carbon. On the back of the conveyance belt (151), a guide member (161) is placed correspondingly to a region where printing is performed by the recording head (134). Note that, as a paper ejection section for ejecting the sheets of paper (142) on which images have been recorded by the recording head (134), there are provided a separation claw (171) for separating the sheets of paper (142) from the conveyance belt (151), a paper ejection roller (172), and a paper ejection roller (173), with the paper ejection tray (103) being placed below the paper ejection roller (172).

A double-sided paper feeding unit (181) is detachably mounted on a rear surface portion of the main body (101). The double-sided paper feeding unit (181) takes in the sheets of paper (142) returned by rotation of the conveyance belt (151) in the opposite direction and reverses it, then re-feeds it between the counter roller (152) and the conveyance belt (151). Note that, a manual paper feeding section (182) is provided on an upper surface of the double-sided paper feeding unit (181).

In this inkjet recording apparatus, the sheets of paper (142) are fed one by one from the paper feeding section, and the sheets of paper (142) fed upward in the substantially vertical direction is guided by the guide (145) and conveyed with being sandwiched between the conveyance belt (151) and the counter roller (152). Furthermore, the conveyance direction of the paper s changed by approximately 90°, as a front end of the paper is guided by the conveyance guide (153) and pressed onto the conveyance belt (151) by the front end pressurizing roller (155).

On this occasion, the conveyance belt (157) is charged by the charging roller (156), and the sheets of paper (142) is electrostatically adsorbed onto the conveyance belt (151) and thusly conveyed. Here, by driving the recording head (134) according to image signals while moving the carriage (133), ink droplets are ejected onto the sheets of paper (142) having stopped so as to perform recording for one line, the sheets of paper (142) is conveyed by a predetermined distance, and then recording for the next line is performed. On receipt of a recording completion signal or a signal indicating that the rear end of the sheets of paper (142) has reached the recording region, recording operation is finished, and the sheets of paper (142) is ejected onto the paper ejection tray (103).

Once the amount of the ink remaining in the sub-tanks (135) has been detected to be too small, a required amount of the ink is supplied from the ink cartridge (200) into the sub-tanks (135).

As for this inkjet recording device, when the ink in the ink cartridge (200) has been used up, it is possible to replace only the ink bag inside the ink cartridge by dismantling a housing of the ink cartridge (200). Also, even when the ink cartridge (200) is vertically arranged and employs a front-loading structure, the ink can be stably supplied. Therefore, even when the main body (101) is installed with little space over it, for example, when the main body (101) is stored in a rack or when an object is placed over the main body, the ink cartridge (200) may be easily replaced.

Note that although the present invention has been described referring to an example in which it is applied to a serial-type (shuttle-type) inkjet recording device where a carriage performs scanning, the present invention can also be applied to a line-type inkjet recording device provided with line-type heads.

<Ink Cartridge>

The ink of the present invention may be housed in a container to thereby use as an ink cartridge. The ink cartridge may further contain appropriately selected other members, if necessary.

The container is not particularly limited and the shape, structure, size, and material thereof may be appropriately selected depending on the intended purpose. Suitable examples thereof include those having an ink bag formed of an aluminum laminate film or a resin film.

Figure 3:
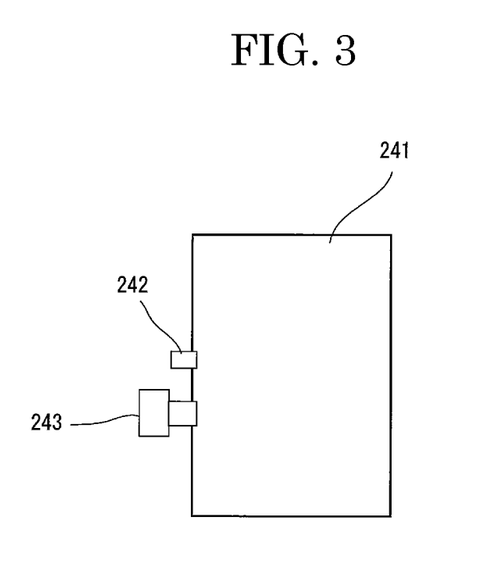
FIG. 3 is one exemplary schematic diagram illustrating an ink bag in an ink cartridge.
Figure 4:
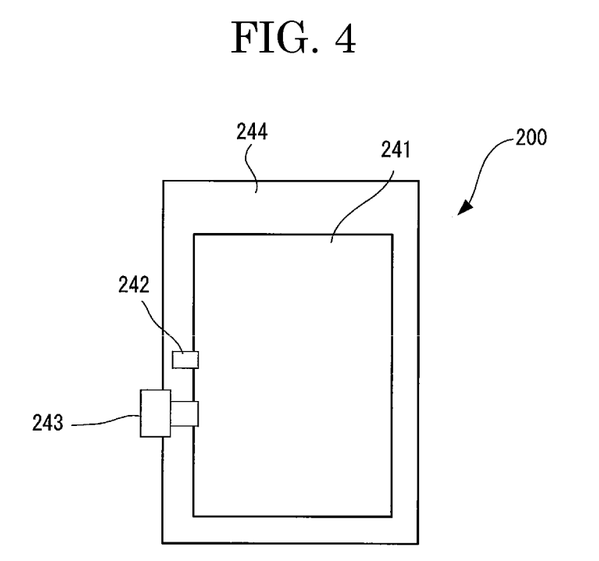
FIG. 4 is a schematic diagram illustrating the ink bag of FIG. 3 housed in a cartridge case.

The ink cartridge will now be described with reference to FIGS. 3 and 4. FIG. 3 is one exemplary schematic diagram illustrating an ink bag 241 in the ink cartridge. FIG. 4 is a schematic diagram illustrating the ink bag 241 of FIG. 3 housed in a cartridge case 244.

As shown in FIG. 3, the ink is charged into the ink bag 241 from an ink inlet 242. After removing residual air from the ink bag, the ink inlet 242 is closed by fusing. When using, a needle equipped in a main body of the device is inserted into an ink outlet 243 formed of a rubber member to thereby supply the ink to the device. The ink bag 241 is formed of an air impermeable wrapping member such as an aluminum laminate film. As shown in FIG. 4, the ink bag is typically housed in the cartridge case 244 formed of plastic, and is detachably mounted to various inkjet recording devices as the ink cartridge 200.

EXAMPLES

The present invention will now be further specifically described with reference to Examples and Comparative Examples, but it is not limited to thereto in any way. Note that, "%" as used in Examples means "% by mass."

Preparation of Pigment Dispersion

Preparative Example 1

Preparation of Dispersion of Surface-Treated Carbon Black Pigment

Ninety grams of carbon black having a CTAB specific surface area of 150 m$^2$/g and a DBP oil absorption amount of 100 mL/100 g was 3,000 mL of a 2.5 N sodium sulfate solution, followed by allowing to react for 10 hours with stirring at 60° C. and 300 rpm. Thus, the carbon black was oxidatively treated. The resultant reaction liquid is filtered, and the carbon black that had been filtered out was neutralized with sodium hydroxide and then subjected to ultrafiltration. The resultant carbon black was washed with water, dried, and then dispersed in pure water so as to have a concentration of 20% to thereby obtain a dispersion of a surface-treated carbon black pigment.

Preparative Example 2

Preparation of Dispersion of Surface-Treated Yellow Pigment

C. I. Pigment Yellow 128 serving as a yellow pigment was treated with plasma at a low temperature to thereby produce a pigment into which a carboxylate group was introduced. The resultant pigment was dispersed in ion-exchanged water, followed by desalting and concentrating through an ultrafiltration membrane to thereby obtain a dispersion of a surface-treated yellow pigment having a pigment concentration of 15%.

Preparative Example 3

Preparation of Dispersion of Surface-Treated Magenta Pigment

C. I. Pigment Red 122 serving as a magenta pigment was treated with plasma at a low temperature to thereby produce a pigment into which a carboxylate group was introduced. The resultant pigment was dispersed in ion-exchanged water, followed by desalting and concentrating through an ultrafiltration membrane to thereby obtain a dispersion of a surface-treated magenta pigment having a pigment concentration of 15%.

Preparative Example 4

Preparation of Dispersion of Surface-Treated Cyan Pigment

C. I. Pigment Blue 15:3 serving as a cyan pigment was treated with plasma at a low temperature to thereby produce a pigment into which a carboxylate group was introduced. The resultant pigment was dispersed in ion-exchanged water, followed by desalting and concentrating through an ultrafiltration membrane to thereby obtain a dispersion of a surface-treated cyan pigment having a pigment concentration of 15%.

Preparative Example 5

Preparation of Carbon Black Pigment Dispersion

Firstly, 150 g of carbon black having the CTAB specific surface area of 150 m$^2$/g and the DBP oil absorption amount of 100 mL/100 g, 110 g of polyoxyethylene-$\beta$-naphthyl ether (RT-100: manufactured by TAKEMOTO OIL & FAT Co., Ltd.), 2 g of a sodium salt of dioctyl sulfosuccinate (PIONIN A-51-B: manufactured by TAKEMOTO OIL & FAT Co., Ltd.) and 738 g of distilled water were mixed together. The resultant mixture was predispersed, followed by circulation dispersion with a disc type bead mill (KDL type, manufactured by SHINMARU ENTERPRISES CORPORATION, media: 0.3 mm $\phi$ zirconia ball) for 20 hours to thereby obtain a carbon black pigment dispersion.

Preparative Example 6

Preparation of Cyan Pigment Dispersion

A cyan pigment dispersion was obtained in the same manner as in Preparative Example 5, except that the carbon black was changed to C. I. Pigment Blue 15:3.

Preparative Example 7

Preparation of Magenta Pigment Dispersion

A magenta pigment dispersion was obtained in the same manner as in Preparative Example 5, except that the carbon black was changed to C. I. Pigment Red 122.

Preparative Example 8

Preparation of Dispersion of Cyan Pigment-Containing Polymer Particles

Synthesis of Polymer

A 1 L flask equipped with a mechanical stirrer, a thermometer, a nitrogen gas introducing pipe, a reflux tube, and a dropping funnel was thoroughly purged with nitrogen gas. To this flask, were added 11.2 g of styrene, 2.8 g of acrylic acid, 12.0 g of lauryl methacrylate, 4.0 g of polyethylene glycol methacrylate, 4.0 g of styrene macromer (trade name: AS-6, manufactured by TOAGOSEI CO., LTD.) and 0.4 g of mercaptoethanol, followed by heating to 65° C. Next, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (trade name: AS-6, manufactured by TOAGOSEI CO., LTD.), 3.6 g of mercaptoethanol, 2.4 g of azobisdimethyl valeronitrile, and 18 g of methyl ethyl ketone was added dropwise to the flask for 2.5 hours. After the completion of the addition, a mixed solution of 0.8 g of azobisdimethyl valeronitrile and 18 g of methyl ethyl ketone was added dropwise to the flask for 0.5 hours. After aging at 65° C. for 1 hour, 0.8 g of azobisdimethyl valeronitrile was added thereto, followed by further aging for 1 hour. After the completion of the aging, 364 g of methyl ethyl ketone was added thereto to thereby obtain 800 g of a 50% polymer solution.

Preparation of Dispersion of Cyan Pigment-Containing Polymer Particles

Twenty eight grams of the polymer solution, 26 g of C. I. Pigment Blue 15:3, 13.6 g of a 1 mol/L potassium hydroxide solution, 20 g of methyl ethyl ketone, and 30 g of ion-exchanged water were thoroughly stirred, and then kneaded with a three-roll mill. The resultant paste was added to 200 g of ion-exchanged water, followed by thoroughly stirring and distilling off methyl ethyl ketone and water using an evaporator to thereby obtain a dispersion of cyan pigment-containing polymer particles.

Preparative Example 9

Preparation of Dispersion of Magenta Pigment-Containing Polymer Particles

A dispersion of magenta pigment-containing polymer particles was obtained in the same manner as in Preparative Example 8, except that the C. I. Pigment Blue 15:3 was changed to C. I. Pigment Red 122.

Preparative Example 10

Preparation of Dispersion of Carbon Black Pigment-Containing Polymer Particles

A dispersion of carbon black pigment-containing polymer particles was obtained in the same manner as in Preparative Example 8, except that the C. I. Pigment Blue 15:3 was changed to carbon black having the CTAB specific surface area of 150 m$^2$/g and the DBP oil absorption amount of 100 mL/100 g.

Examples 1 to 11 and Comparative Examples 1 to 6

Preparation of Ink

The water-soluble organic solvent, the permeating agent, the pH adjusting agent, the antibacterial agent, the surfactant and the water described in each column of Examples and Comparative Examples in Tables 1-1 to 2 were uniformly mixed through stirring together for 1 hour. Next, the foam suppressor was added thereto, followed by uniformly mixing through further stirring together for 1 hour. Thereafter, each of the pigment dispersions of Preparative Examples 1 to 10 was added thereto, followed by uniformly mixing through further stirring together for 1 hour. The resultant mixture was filtered through a polyvinylidene fluoride membrane filter having an average pore diameter of 0.8 μm under pressure to remove coarse particles and debris to thereby obtain inks of Examples and Comparative Examples.

The inks of Examples and Comparative Examples were measured for properties and evaluated as follows.

Results are summarized in Tables 1-1 to 2. Note that, numerical values in Tables are in % by mass.

(Evaluation of Image Blackness)

Each of the inks was loaded into an inkjet printer IPSIO GX E5500 (manufactured by Ricoh Company, Ltd.). An A4-sized whole solid image was printed at a recording density of 600× 300 dpi and in one-pass.

Plain paper (P-PAPER GF-500, A4, manufactured by Canon Inc.) was used for a printing test. After printing and drying, the resultant image was measured for brightness and saturation by a reflective color spectrodensitometer X-RITE 938 (manufactured by X-Rite, Inc.).

Blackness was calculated based on the measured L value, a value, and b value, and evaluated according to the following criteria. Note that, the blackness was calculated according to the following equation:

$$\text{Blackness} = L + (a^2 + b^2)^{1/2}$$

[Evaluation Criteria]

A: Blackness of less than 30.
B: Blackness of 30 or more but less than 32.
C: Blackness of 32 or more but less than 34.
D: Blackness of 34 or more.

(Evaluation of Storage Stability)

Each of the inks was charged into a 20 mL of glass bottle, followed by leaving in a thermostat bath at 70° C. for 2 weeks. The ink was measured for a difference between an initial volume average particle diameter and a volume average particle diameter after 2 weeks of storage (i.e., degree of pigment aggregation) and evaluated according to the following criteria.

The volume average particle diameters were measured by UPA-EX150 (manufactured by MicrotracBEL Corp.) as follows. The ink was diluted 250 times with ion-exchanged water and added to a measurement cell. The measurement was performed at 25° C. for 60 seconds. Note that, the volume average particle diameter of the ink substantially means a volume average particle diameter of the pigment contained in the ink.

[Evaluation Criteria]

A: Rate of change from initial particle diameter is less than 10%.
B: Rate of change from initial particle diameter is 10% or more but less than 20%.
C: Rate of change from initial particle diameter is 20% or more.

TABLE 1

| | Component | Ex. 1 | Ex. 2 | Ex. 3 | Ex. 4 | Ex. 5 | Ex. 6 |
|---|---|---|---|---|---|---|---|
| Pigment dispersion | Pre. Ex. 1 Self-dispersion CB | 10.000 | 10.000 | 50.000 | 50.000 | 60.000 | 20.000 |
| | Pre. Ex. 5 Dispersing agent dispersion CB | | | | | | |
| | Pre. Ex. 10 Resin dispersion CB | | | | | | |
| | Pre. Ex. 2 Self-dispersion Y | | | | | 1.000 | 1.000 |
| | Pre. Ex. 3 Self-dispersion M | | | | | | 1.000 |
| | Pre. Ex. 4 Self-dispersion C | | | | | | |
| | Pre. Ex. 6 Dispersing agent dispersion C | 0.150 | | | | | |
| | Pre. Ex. 7 Dispersing agent dispersion M | | | 0.500 | | | |
| | Pre. Ex. 8 Resin dispersion C | | 2.600 | | 13.000 | | |
| | Pre. Ex. 9 Resin dispersion M | | | | | | |
| Water-soluble Organic solvent | Glycerin | 11.000 | 11.000 | 2.200 | 2.200 | 1.833 | 5.500 |
| | 13BD | 22.000 | 22.000 | 4.400 | 4.400 | 3.667 | 11.000 |
| | MBD | 3.000 | 3.000 | | | | 1.500 |
| Permeating agent | EHD | 1.000 | 1.000 | 1.000 | 1.000 | 1.000 | 1.000 |
| Foam suppressor | KM-72F | 1.000 | 1.000 | 1.000 | 1.000 | 1.000 | 1.000 |
| Surfactant | Fluorosurfactant | | | | | | |
| pH adjusting agent | AEPD | 0.200 | 0.200 | 0.200 | 0.200 | 0.500 | 0.200 |
| Antibacterial agent | PROXEL GXL | 0.100 | 0.100 | 0.100 | 0.100 | 0.100 | 0.100 |
| Water | Ion-exchanged water | 51.550 | 49.100 | 40.600 | 28.100 | 30.900 | 57.700 |
| Total | | 100.000 | 100.000 | 100.000 | 100.000 | 100.000 | 100.000 |
| Amount of carbon black contained in ink (% by mass) | | 2.000 | 2.000 | 10.000 | 10.000 | 12.000 | 4.000 |
| Amount of complementary color pigment relative to that of carbon black (% by mass) | | 0.011 | 0.195 | 0.008 | 0.195 | 0.013 | 0.075 |
| Blackness | | B | B | C | A | C | A |
| Storage stability | | A | A | A | A | B | A |

| | Component | Ex. 7 | Ex. 8 | Ex. 9 | Ex. 10 | Ex. 11 | Ex. 12 |
|---|---|---|---|---|---|---|---|
| Pigment dispersion | Pre. Ex. 1 Self-dispersion CB | | | | | | 20.000 |
| | Pre. Ex. 5 Dispersing agent dispersion CB | 20.000 | 10.000 | 20.000 | | | |
| | Pre. Ex. 10 Resin dispersion CB | | | | 20.000 | 30.000 | |
| | Pre. Ex. 2 Self-dispersion Y | | | | | | 1.000 |
| | Pre. Ex. 3 Self-dispersion M | | | 5.000 | 1.000 | | 1.000 |
| | Pre. 4 Ex. Self-dispersion C | 1.000 | 2.000 | | | 1.000 | |
| | Pre. Ex. 6 Dispersing agent dispersion C | | | | | | |
| | Pre. Ex. 7 Dispersing agent dispersion M | | | | | | |
| | Pre. Ex. 8 Resin dispersion C | | | | | | |

TABLE 1-continued

|  |  |  |  |  |  |  |  |
|---|---|---|---|---|---|---|---|
|  | Pre. Ex. 9 Resin dispersion M |  |  |  |  |  |  |
| Water-soluble Organic solvent | Glycerin | 7.333 | 14.667 | 7.333 | 7.333 | 4.889 | 5.500 |
|  | 13BD | 14.667 | 29.333 | 14.667 | 14.667 | 9.778 | 11.000 |
|  | MBD | 2.000 | 4.000 | 2.000 | 2.000 | 1.333 | 1.500 |
| Permeating agent | EHD | 1.000 | 1.000 | 1.000 | 1.000 | 1.000 | 1.000 |
| Foam suppressor | KM-72F | 1.000 | 1.000 | 1.000 | 1.000 | 1.000 | 1.000 |
| Surfactant | Fluorosurfactant |  |  |  |  |  | 0.400 |
| pH adjusting agent | AEPD | 0.200 | 0.200 | 0.500 | 0.200 | 0.200 | 0.200 |
| Antibacterial agent | PROXEL GXL | 0.100 | 0.100 | 0.100 | 0.100 | 0.100 | 0.100 |
| Water | Ion-exchanged water | 52.700 | 37.700 | 48.400 | 52.700 | 50.700 | 57.300 |
| Total |  | 100.000 | 100.000 | 100.000 | 100.000 | 100.000 | 100.000 |
| Amount of carbon black contained in ink (% by mass) |  | 3.000 | 1.500 | 3.000 | 3.000 | 4.500 | 4.000 |
| Amount of complementary color pigment relative to that of carbon black (% by mass) |  | 0.050 | 0.200 | 0.250 | 0.050 | 0.033 | 0.075 |
| Blackness |  | A | C | C | A | A | A |
| Storage stability |  | A | B | A | A | A | A |

TABLE 2

|  | Component | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Pigment dispersion | Pre. Ex. 1 Self-dispersion CB |  | 10.000 |  |  |  |  |
|  | Pre. Ex. 5 Dispersing agent dispersion CB | 13.400 |  | 20.000 |  | 20.000 |  |
|  | Pre. Ex. 10 Resin dispersion CB |  |  |  | 20.000 |  | 20.000 |
|  | Pre. Ex. 2 Self-dispersion Y |  |  |  |  |  |  |
|  | Pre. Ex. 3 Self-dispersion M |  |  |  |  |  |  |
|  | Pre. re. Ex. 4 Self-dispersion C |  |  |  |  |  |  |
|  | Pre. Ex. 6 Dispersing agent dispersion C | 0.150 |  | 1.000 |  |  |  |
|  | Pre. Ex. 7 Dispersing agent dispersion M |  |  |  | 5.000 |  |  |
|  | Pre. Ex. 8 Resin dispersion C |  |  |  |  | 1.000 |  |
|  | Pre. Ex. 9 Resin dispersion M |  |  |  |  |  | 1.000 |
| Water-soluble Organic solvent | Glycerin | 10.945 | 11.000 | 7.333 | 7.333 | 7.333 | 7.333 |
|  | 13BD | 21.891 | 22.000 | 14.667 | 14.667 | 14.667 | 14.667 |
|  | MBD | 2.985 | 3.000 | 2.000 | 2.000 | 2.000 | 2.000 |
| Permeating agent | EHD | 1.000 | 1.000 | 1.000 | 1.000 | 1.000 | 1.000 |
| Foam suppressor | KM-72F | 1.000 | 1.000 | 1.000 | 1.000 | 1.000 | 1.000 |
| Surfactant | Fluorosurfactant |  |  |  |  |  |  |
| pH adjusting agent | AEPD | 0.200 | 0.200 | 0.200 | 0.200 | 0.200 | 0.200 |
| Antibacterial agent | PROXEL GXL | 0.100 | 0.100 | 0.100 | 0.100 | 0.100 | 0.100 |

TABLE 2-continued

| | Component | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Water | Ion-exchanged water | 48.329 | 51.700 | 52.700 | 48.700 | 52.700 | 52.700 |
| Total | | 100.000 | 100.000 | 100.000 | 100.000 | 100.000 | 100.000 |
| Amount of carbon black contained in ink (% by mass) | | 2.010 | 2.000 | 3.000 | 3.000 | 3.000 | 3.000 |
| Amount of complementary color pigment relative to that of carbon black (% by mass) | | 0.011 | 0.000 | 0.050 | 0.250 | 0.050 | 0.050 |
| Blackness | | B | D | A | C | A | A |
| Storage stability | | C | C | C | C | C | C |

Details of the components described in abbreviations in the above tables are as follows.

13BD: 1,3-butanediol
MBD: 3-methyl-1,3-butanediol
EHD: 2-ethyl-1,3-hexanediol
KM-72F: Self-emulsifying silicone anti-foaming agent (manufactured by Shin-Etsu Chemical Co., Ltd.)
AEPD: 2-amino-2-ethyl-1,3-propanediol
PROXEL GXL: 1,2-benzisothiazolin-3-on, 20% aqueous solution in dipropylene glycol (manufactured by Avecia Inc.)
Surfactant: the compound represented by the following formula:

$C_4F_9$—$CH_2CH(OH)CH_2O$—$(CH_2CH_2O)_{23}$—$CH_2CH(OH)CH_2$—$C_4F_9$

From the results described in Tables 1-1 to 2, it has been found that an ink which contains carbon black and a complementary color pigment thereof each serving as a colorant and in which the carbon black, the complementary color pigment, or a combination thereof is a self-dispersion type pigment is excellent in blackness and storage stability.

Additionally, it has been found that amounts of the carbon black and the complementary color pigment meeting the requirement described in claim 2 result in more excellent blackness.

Furthermore, it has been found that use of C. I. Pigment Blue 15:3 or C. I. Pigment Red 122 as the complementary color pigment results in more excellent blackness and storage stability.

Aspects of the present invention are as follows.
<1> A black ink for inkjet recording, including:
carbon black and a complementary color pigment thereof each serving as a colorant;
a water-soluble organic solvent; and
water,
wherein the carbon black, the complementary color pigment, or a combination thereof is a self-dispersion type pigment.
<2> The black ink for inkjet recording according to <1>, wherein a percentage of an amount of the carbon black relative to a total amount of the ink is 2% by mass to 10% by mass.
<3> The black ink for inkjet recording according to <1>, wherein a percentage of an amount of the complementary color pigment contained in the total amount of the ink relative to the amount of the carbon black is 0.01% by mass to 0.2% by mass.
<4> The black ink for inkjet recording according to <1>, wherein the carbon black is any one selected from the group consisting of furnace black, gas black, lamp black, acetylene black, and channel black.
<5> The black ink for inkjet recording according to <1>, wherein the water-soluble organic solvent is 1,3-butanediol, 3-methyl-1,3-butanediol, or both thereof.
<6> The black ink for inkjet recording according to <1>, wherein the ink includes C. I. Pigment Blue 15:3, C. I. Pigment Red 122, or both thereof as the complementary color pigment.
<7> The black ink for inkjet recording according to <2>, wherein the ink includes C. I. Pigment Blue 15:3, C. I. Pigment Red 122, or both thereof as the complementary color pigment.
<8> The black ink for inkjet recording according to <3>, wherein the ink includes C. I. Pigment Blue 15:3, C. I. Pigment Red 122, or both thereof as the complementary color pigment.
<9> An ink cartridge, including:
a container; and
a black ink for inkjet recording housed in the container;
wherein the black ink for inkjet recording includes carbon black and a complementary color pigment thereof each serving as a colorant, a water-soluble organic solvent, and water, and
wherein the carbon black, the complementary color pigment, or a combination thereof is a self-dispersion type pigment.
<10> An inkjet recording device, including:
an ink jetting unit configured to apply stimuli to a black ink for inkjet recording to allow the black ink for inkjet recording to jet to thereby record an image on a recording medium;
wherein the black ink for inkjet recording includes carbon black and a complementary color pigment thereof each serving as a colorant, a water-soluble organic solvent, and water, and
wherein the carbon black, the complementary color pigment, or a combination thereof is a self-dispersion type pigment.

This application claims priority to Japanese application No. 2014-043768, filed on Mar. 6, 2014 and incorporated herein by reference.

What is claimed is:
1. A black ink for inkjet recording, comprising:
carbon black and a complementary color pigment thereof each serving as a colorant;
a water-soluble organic solvent; and
water,
wherein the carbon black, the complementary color pigment, or a combination thereof is a self-dispersion type pigment, and
wherein a percentage of an amount of the complementary color pigment relative to an amount of the carbon black is 0.01% by mass to 0.2% by mass.

2. The black ink for inkjet recording according to claim 1, wherein a percentage of the amount of the carbon black relative to a total amount of the ink is 2% by mass to 10% by mass.

3. The black ink for inkjet recording according to claim 2 wherein the ink comprises C. I. Pigment Blue 15:3, C. I. Pigment Red 122, or both thereof as the complementary color pigment.

4. The black ink for inkjet recording according to claim 1, wherein the carbon black is any one selected from the group consisting of furnace black, gas black, lamp black, acetylene black, and channel black.

5. The black ink for inkjet recording according to claim 1, wherein the water-soluble organic solvent is 1,3-butanediol, 3-methyl-1,3-butanediol, or both thereof.

6. The black ink for inkjet recording according to claim 1, wherein the ink comprises C. I. Pigment Blue 15:3, C. I. Pigment Red 122, or both thereof as the complementary color pigment.

7. An ink cartridge, comprising:
 a container; and
 a black ink for inkjet recording housed in the container;
 wherein the black ink for inkjet recording comprises carbon black and a complementary color pigment thereof each serving as a colorant, a water-soluble organic solvent, and water, and
 wherein the carbon black, the complementary color pigment, or a combination thereof is a self-dispersion type pigment, and
 wherein a percentage of an amount of the complementary color pigment relative to an amount of the carbon black is 0.01% by mass to 0.2% by mass.

8. An inkjet recording device, comprising:

an ink jetting unit configured to apply stimuli to a black ink for inkjet recording to allow the black ink for inkjet recording to jet to thereby record an image on a recording medium;

wherein the black ink for inkjet recording comprises carbon black and a complementary color pigment thereof each serving as a colorant, a water-soluble organic solvent, and water, and wherein the carbon black, the complementary color pigment, or a combination thereof is a self-dispersion type pigment, wherein a percentage of an amount of the complementary color pigment relative to an amount of the carbon black is 0.01% by mass to 0.2% by mass.

\* \* \* \* \*